Feb. 27, 1940.  C. H. NICKELL  2,191,677
BRAKING APPARATUS
Filed Jan. 15, 1938  2 Sheets-Sheet 1
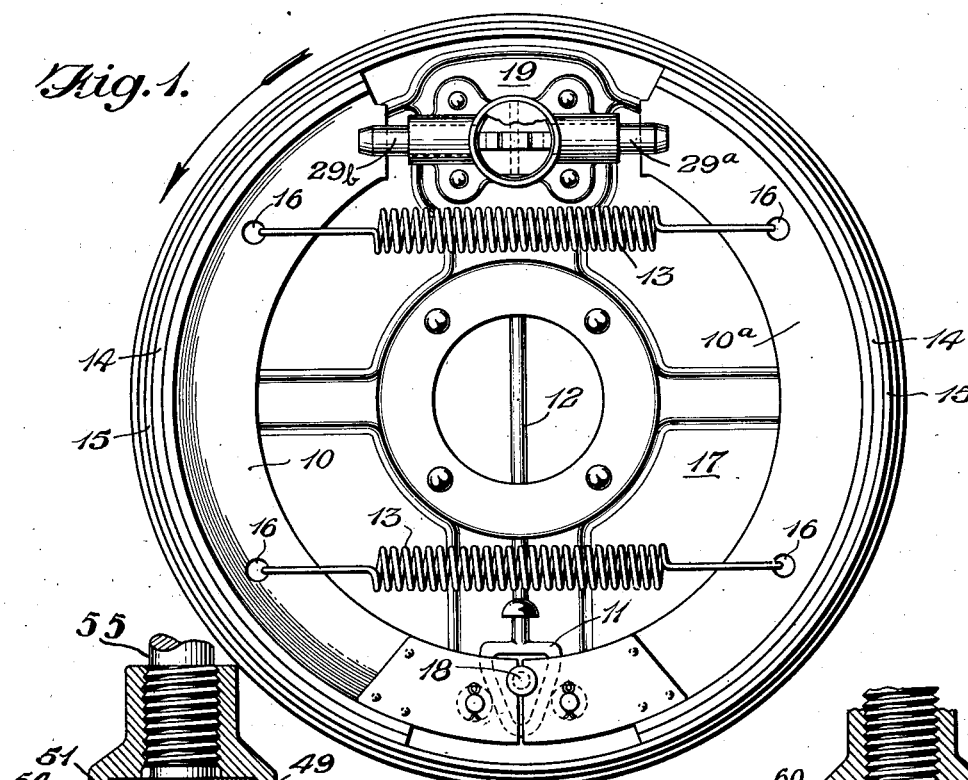
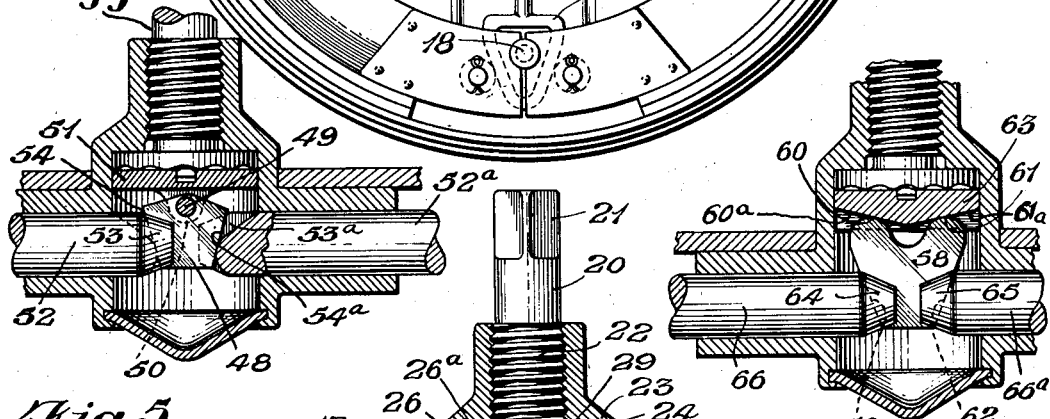
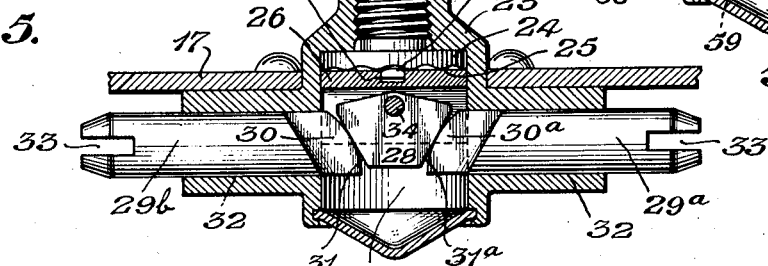

Feb. 27, 1940.  C. H. NICKELL  2,191,677
BRAKING APPARATUS
Filed Jan. 15, 1938   2 Sheets-Sheet 2
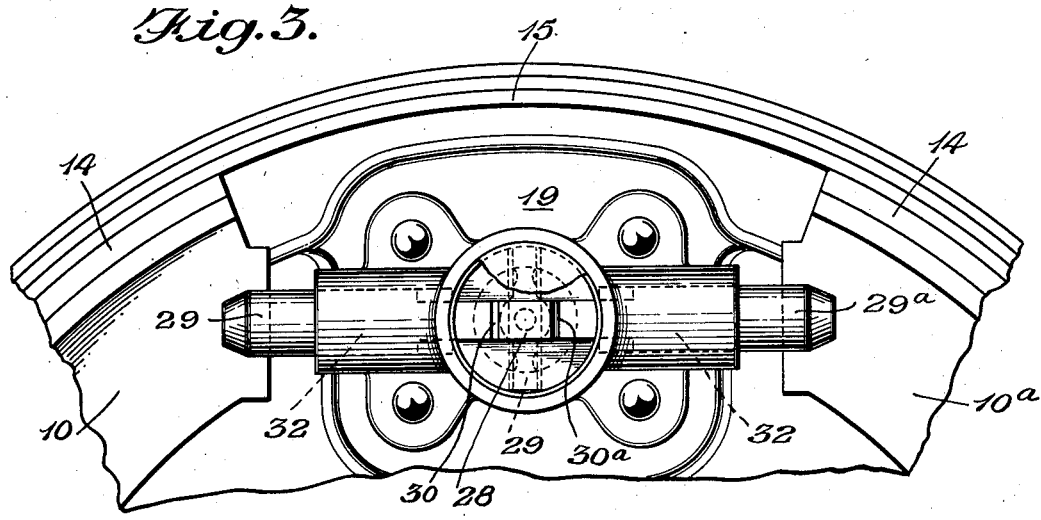
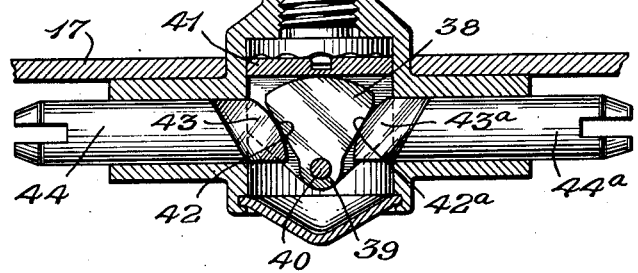
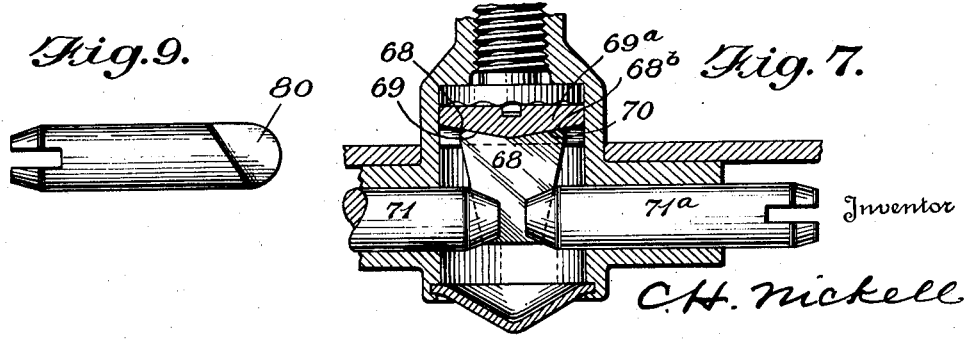

Patented Feb. 27, 1940

2,191,677

UNITED STATES PATENT OFFICE 2,191,677

BRAKING APPARATUS

Claude H. Nickell, Newcastle, Ind.

Application January 15, 1938, Serial No. 185,214

18 Claims. (Cl. 188—79.5)

This invention relates to brakes and more particularly to a combined connecting link and adjustment device for use in connection with multiple shoe brakes.

After a period of use, ordinary brake shoe linings wear. Adjustment devices have been provided for taking up this wear in various ways. Inherent in the structure of such adjustment devices it has not been uncommon to include a connecting link arrangement whereby a plurality of brake shoes are tied together in operative relation to a brake drum. In some cases the connecting link is so arranged that one brake shoe may not transmit motion through the link to another shoe. In other arrangements the link is so associated with the brake shoes that the entire link may move freely to cause motion to be transmitted from one shoe to an adjacent shoe. In still other prior devices the connecting link body is held stationary and is provided with operative plungers extending therethrough which move freely as a unit throughout their length to transmit motion from one shoe to an adjacent shoe. In some of the above mentioned devices the adjustment provided for the taking up of wear of the brake shoes completely interferes with the transmission of motion from one shoe to another, while in other of the devices discussed no interference is found.

It is an object of my invention to provide a combined brake shoe adjusting and connecting link of relatively simple construction wherein modified motion may be transmitted from one shoe to an adjoining shoe and wherein the shoe lining may be taken up as desired.

It is a further object of my invention to provide a combined adjusting and connecting link of a nature wherein movement of one shoe will transmit a force to an adjoining shoe of varying amount during its movement.

Other objects and the nature and advantages of the invention will be apparent from the following description taken in conjunction with the accompanying drawings, wherein:

Fig. 1 is a front elevation of a brake shoe system incorporating my invention.

Fig. 2 is a view in cross-section with parts shown in elevation of the connecting link itself and illustrating the adjustment for wear.

Fig. 3 is a fragmentary enlarged elevational view of a connecting and adjusting link shown in Fig. 1.

Fig. 4 is a view in perspective of portions of the elements within the device.

Fig. 5 is a fragmentary cross-sectional view with parts shown in elevation similar to Fig. 2, but of a modification thereof.

Fig. 6 is a view similar to Fig. 2, but of a modified form thereof.

Fig. 7 is a view similar to Fig. 5, but of a still further modified form.

Fig. 8 is a view similar to Fig. 7, but of a somewhat further modified arrangement.

Fig. 9 is a view in elevation of a modified form of plunger for use in connection with my device.

Referring to the Figs. 1, 2, 3 and 4, but particularly to Fig. 1, brake shoes 10 and 10a are arranged for actuation by operating cam 11, which upon being moved downwardly by a rod 12 spreads the brake shoes 10 and 10a against the tension of retraction springs 13, causing the linings 14 to contact brake drum 15. The springs 13 may be of helical or any other type and are anchored to portions of the brake shoes 10 and 10a by any suitable means such as hooks formed integral with the ends of the springs themselves, which engage holes 16 formed within the brake shoes. The retraction springs 13, when the brake is not applied, tend to hold the brake shoes 10 and 10a out of contact with the braking surface of the drum 15.

The brake carrier plate 17 acts as a base for the entire brake assembly and is stationary with respect to the movable brake shoes 10 and 10a, which move outwardly into operative engagement with brake drum 15 under the influence of actuating cam 11 and are retracted toward the center of brake carrier plate 17 under the influence of retraction springs 13 when actuating cam 11 is released, the lower ends of the brake shoes 10 and 10a approaching and coming tightly against anchor pin 18, which is fixedly associated with carrier plate 17.

To compensate for wear of brake linings 14, I have interposed an adjustment and connecting device 19, shown in section in Fig. 2, between the upper portions of brake shoes 10 and 10a. To take up wear in the linings 14, a screw 20 has been provided with one of its ends formed with a polygonal section 21 adapted to be turned by a wrench or key, not shown, mating therewith and a body portion 22 threaded in screw relation to the central portion of casting 23 and a disc-like end portion 24 having its lower face formed with undulations 25.

Immediately below the disc-like end portion 24, and in operative engagement therewith, pressure plate 26 is arranged to freely slide within cylindrical bore 27 formed within casting 23. The plate 26 is formed with a groove or slot 26a in its upper portion whereby spring element 29 which is curved to correspond to each section of the undulations 25 may be held against rotation when the screw 20 is turned in either direction. With this arrangement a clicking noise is effected when the screw 20 is turned and the spring 29 is moved from one section of the undulations to an adjoining section and acts as a lock to prevent rotation of the screw 20 whenever such rotation is not desired.

Upon rotation of the screw 20 in a direction to cause it to move further into the bore 27 the pressure plate 26 is forced in a downwardly direction causing the cam element 28 to move in a similar direction and effecting outward movement of plungers 29a and 29b having ends 30 and 30a in engaging relation with the faces 31 and 31a of cam 28. The plungers 29a and 29b are arranged to slide within aligned bores 32 formed at right angles to the bore 27 within the casting 23. The downward movement of the cam element 28 causes an outward movement of the plungers 29a and 29b which are slotted at their outer ends 33 and engage with the upper portions of brake shoes 10 and 10a, causing outward movement of the said shoes to reduce the clearance between the worn brake linings 14 and the brake drum 15.

With the brake drum 15 revolving in the direction of the arrows as shown in Fig. 1, when the actuating cam 11 is applied to effect a braking action, the brake shoes 10 and 10a are first moved outwardly until the linings 14 begin to contact the drum 15; further movement of the actuating cam 11 from then on causes rotation of the shoe 10a which transmits motion in stepped up or modified form through plunger 29a, cam 28 which may be pivotally supported to pressure plate 26 through the medium of pin 34, through plunger 29b to brake shoe 10 which then rotates but at a speed which may be greater or differing from that at which 10a travels, depending on the contours of the arm surfaces, until it engages anchor pin 18. Further movement of the actuating cam 11 transmits a similar motion from shoe 10a to shoe 10 but in further modified form in that the motion may be still increased during its transmission through plunger 29a, cam 28 and plunger 29b. As the lining wears and the adjustment screw 20 is rotated to effect movement of the cam 28 to compensate for the narrow thinner lining, the motion transmitted from shoe 10a, plunger 29a, cam 28, plunger 29b to shoe 10 is further stepped up, that is, a greater relative movement of shoe 10 takes place relative to the motion of 10a, which is sometimes desirable. It is to be understood that when the drum 15 rotates in a direction opposite from that shown by the arrow in Fig. 1, that similarly, motion will be transmitted from brake shoe 10 to brake shoe 10a through plunger 29b, cam 28, and plunger 29a.

The plunger 29a illustrated in Fig. 2 may be considered as the driving plunger and when motion is imparted to it by shoe 10a, its curved end 30a engages the surface 31a of the cam 28 which rocks about the pin 34 causing the cam surface 31 to slidably engage the end 30 of the plunger 29b which moves outwardly causing rotation of the shoe 10. Because of the inclination of the cam surfaces 31 and 31a and the contours of the plunger ends 30 and 30a, as shown in the drawings, a predetermined movement of the plunger 29a will be increased or stepped up when transmitted to driven plunger 29b but the force within driving plunger 29a will be decreased or stepped down in its transmission to plunger 29b in a similar manner to that which takes place when a large force is applied to a lever fulcrumed intermediate its ends with the fulcrum closer to the end at which the force is applied. In this case the force which may be taken off at the opposite end of the lever will be less than the force applied at the short or first end.

Referring to Fig. 6 the arrangement shown is similar to that illustrated in Figs. 2, 3 and 4 but differing in that the cam 38 is pivoted at its lower end 39 through the medium of pin 40 attached to pressure plate 41. The contours of the cam surface 42, 42a and end portions 43 and 43a of plungers 44 and 44a are such that the same relative movement for a given adjustment setting will take place as occurs within the form of my invention illustrated in Figs. 2, 3 and 4. The plungers 44 and 44a may be identical with the plungers 29 and 29a and similarly the remaining portions of this embodiment may be interchangeable with corresponding portions of the embodiment shown in Figs. 2, 3 and 4 with the exception of the cam 38 which as has already been pointed out is pivoted at the opposite end to that shown in Fig. 2.

In the modified form of the invention illustrated in Fig. 5 the cam 48 is pivotally mounted at its top through the medium of pin 49 which is attached to the ears 50 formed integral with the pressure plate 51. In this modification the plungers 52 and 52a differ somewhat from the plungers 29 and 29a in that their inner ends 53 and 53a which cooperate with the cam 48 are slotted in a manner to engage the cam sides 54 and 54a on three surfaces. The relative movement of the plungers 52 and 52a is similar to that which takes place in the form illustrated in Fig. 2 and already described. The slotted end construction of the plungers 52 and 52a prevents the cam 48 from turning with rotation of adjusting screw 55 and further materially decreases the necessary size of pressure plate 51.

In the form of the invention illustrated in Fig. 8 the cam 58 is not pivotally supported but contains four major cam surfaces 59, 60, 61 and 62. The surfaces 60 and 61 cooperate with the coacting cam surfaces 60a and 61a milled at an angle in the bottom side of the pressure plate 63 to form a track. The cam surfaces 59 and 62 cooperate with the slotted end portions 64 and 65 of the plungers 66 and 66a which may be similar to the plungers 52 and 52a illustrated in the embodiment shown in Fig. 5. The relative motion transmitted from driving plunger 66a through the medium of cam 58 to the driven plunger 66 will be similar to that delivered from the driving plunger 29a to the driven plunger 29 in the embodiment shown in Fig. 2. The remaining elements not described in Fig. 8 are interchangeable with those illustrated in Figs. 2, 3 and 4, which have already been described. The effect of the rounded contours of the surfaces 60 and 61 of the cam 58 tends to effect a rocking motion of the cam 58 when motion is transmitted from the driving plunger 66a to the driven plunger 66.

The embodiment depicted in Fig. 7 is substantially identical with the form of the invention illustrated in Fig. 8, all parts being interchangeable, with the exception of the cam element 68, the contours or cam surfaces 69 and 70 of which at its upper portion being formed to correspond to the lower track surfaces 68a and 68b of the pressure plate 69a, which, when motion is transmitted from driving plunger 71a to driven plunger 71 tends to move downwardly rather than rocking to effect the desired result.

In Fig. 9 I have illustrated a modified form of plunger having a round inner cam engaging end 80 which may or may not be slotted as in plungers 71 and 71a in Fig. 7, which may be utilized in any of the embodiments already described such as that shown in Figs. 2, 5, 6, 7 and 8. The difference between this form of plunger and those already described lies in the form of cam engaging surface or end 80 which is generally arcuate in form and may be utilized to effect a modified driving action when desired.

The effect on the movement of the plungers with the different positions of the wear adjustment screws in the various modifications will be as follows: The speed of driven plunger in the form of my device illustrated in Figs. 2, 5, and 8 relative to the speed of the driving plunger will be increased as the adjustment screw is turned to take up clearance between the shoe linings and the drum. The speed of the driven plunger, in the form of my device illustrated in Fig. 6, relative to the speed of the driving plunger will decrease as the adjustment screw is turned to take up clearance. The relative speeds of the plungers in the form shown in Fig. 7 will remain substantially constant with variations in the adjustment for wear.

It is to be understood, however, that only some of the forms of cam surfaces have been illustrated in the drawings and described in the specification within the scope of my invention and that it is conceivable without departure from its spirit that other forms of cam surfaces may be utilized in connection with my device to effect the same or varied results as desired in accordance with the conditions under which the device is to operate. In none of the forms illustrated and described do the plungers and cam move freely as a unit to transmit motion from one shoe to an adjoining shoe. On the contrary in all cases the motion of the cam is at variance with the motion of the plungers. In the embodiment shown in Figs. 1, 2, 3, 4, 5, 6 and 8 the driving plunger moves at one speed in a predetermined direction, the cam oscillates in an arcuate path, and the driven plunger though aligned with the driving plunger moves at a different speed therefrom. In the operation of the modification illustrated in Fig. 7 the driving plunger 71a moves in a predetermined direction at one speed, the cam 68 moves generally downwardly, and the driven plunger moves in alignment with the driving plunger 71a but at greater speed.

It has been found in practice that when an adjusting and connecting link which will permit no transmission of motion between shoes 10a and 10 is utilized in place of the connecting and adjusting link 19 in the construction illustrated in Fig. 2 that the brake shoe 10a will tend to wear at a greater rate than the brake shoe 10. This phenomenon occurs by reason of the fact that effective braking takes place between the shoe lining 10a and the brake drum 15 which generally travel in the same direction; the shoe lining 10 traveling generally in an opposite direction from that of the brake drum when the brakes are applied, effects no substantial braking action but a reaction taking place against the side of the cam adjacent that shoe traveling in a direction opposite to the rotation of the drum. This abnormal wearing of the brake shoe lining associated with brake shoe 10a is of course undesirable. It has also been found in practice that when a connecting link is used which will permit absolutely free transmission of motion between shoes 10a and 10, in place of the connecting and adjusting link 19 and the construction illustrated in Fig. 2, that the opposite effect will take place in that the lining associated with the shoe 10 will wear at a greater rate than the lining associated with the shoe 10a. With this arrangement the reaction effected by the friction between the lining associated with the shoe 10a and the drum 15 is transmitted through the freely moving link to the lining associated with the shoe 10, causing a greater friction and braking effect between the lining associated with the shoe 10 and the drum 15 and accompanying greater wear thereof. This uneven wear of the brake shoe linings as in the first case described is likewise undesirable.

With the arrangement illustrated in the drawings and described above, however, it is possible to effect a substantially even wear of the brake shoe linings by controlling and modifying the motion transmitted from the brake shoe 10a to the brake shoe 10 when the actuating cam 11 is operated. By designing the inner surfaces of the plungers and the cam surfaces in accordance with the results desired, even braking action with regard to both shoes results. Further, this effect takes place with the drum rotating in either direction.

It will be obvious to those skilled in the art that various changes may be made in this device without departing from the spirit of the invention and therefore the invention is not limited to what is shown in the drawings and described in the specification but only as indicated in the appended claims.

I claim:

1. An adjusting and connecting link for brake shoes comprising a housing, a driving element and a driven element operatively supported by said housing, means for causing a varying modified movement of said driven element when a predetermined movement is given to said driving element, and an operating element operable on said link for effecting adjustment of the distance between the driving and driven elements.

2. An adjusting and connecting link for brake shoes comprising a housing, a driving element and a driven element operatively supported by said housing, means for causing a varying modified movement of said driven element when a predetermined movement is given to said driving element, an adjustment device arranged in association with said driving element and said driven element to affect the distance between them.

3. An adjusting and connecting link for brake shoes comprising a housing, a driving element and a driven element operatively supported by said housing, means for causing a modified movement of said driven element when a predetermined movement is given to said driving element, an adjustment device arranged in association with said driving element and said driven element to affect the distance between them, said last mentioned means including a pressure plate.

4. An adjusting and connecting link for brake shoes or the like comprising a housing having aligned bores on opposite sides, plungers slidably arranged in said bores, a cam pivotally supported and having surfaces engaging the inner surfaces of the said plungers, an adjustment device associated with said housing for causing bodily movement of said cam to affect the distance between the inner ends of said plungers, said cam being so pivotally supported and said cam surfaces having such contours, as to effect a modified movement of one of said plungers when a predetermined movement is given to the second of said plungers.

5. An adjusting and connecting link for brake shoes or the like comprising a housing having aligned bores on opposite sides, plungers slidably arranged in said bores, a cam pivotally supported and having surfaces engaging the inner surfaces of the said plungers, an adjustment device associated with said housing for causing bodily movement of said cam to affect the distance between the inner ends of said plungers.

6. An adjusting and connecting link for brake shoes or the like comprising a housing having aligned bores on opposite sides, plungers slidably arranged in said bores, a cam pivotally supported and having surfaces engaging the inner surfaces of the said plungers, a pressure plate arranged in engaging relationship with said cam for causing bodily movement thereof to affect the distance between the inner ends of said plungers, and means for causing movement of said pressure plate.

7. An adjusting and connecting link for brake shoes or the like comprising a housing having aligned bores on opposite sides, plungers slidably arranged in said bores, a cam pivotally supported and having surfaces engaging the inner surfaces of the said plungers, a pressure plate arranged in engaging relationship with said cam for causing bodily movement thereof to affect the distance between the inner ends of said plungers, and means for causing movement of said pressure plate, said cam being so pivotally supported and formed with cam surfaces having such contours as to effect a modified movement of one of said plungers when a predetermined movement is given to the second of said plungers.

8. An adjusting and connecting link for brake shoes or the like comprising a housing having diametrically opposed bores, plungers slidably supported therein, a cam associated with the inner ends of said plungers in a manner to effect a modified movement of one of the plungers when a predetermined movement is given to the second plunger, adjustment means associated with said housing and causing bodily movement of said cam to affect the distance between the inner ends of said plungers.

9. An adjusting and connecting link for brake shoes or the like comprising a housing having diametrically opposed bores, plungers slidably supported therein, a cam associated with the inner ends of said plungers in a manner to effect a modified movement of one of the plungers when a predetermined movement is given to a second plunger, a pressure plate for causing bodily movement of said cam, and adjusting means associated with said housing for effecting movement of said pressure plate whereby the distance between the inner ends of said plungers may be varied.

10. An adjusting and connecting link for brake shoes or the like comprising a housing having diametrically opposed bores, plungers slidably engaged in said bores and arranged to support a cam, an adjustment device associated with said cam in a manner to cause said cam to vary its position in relation to the inner ends of said plungers to affect the distance between the said inner ends, said cam having surfaces so related to the surfaces of the inner ends of said plungers that when movement is given to one of said plungers a modified movement is effected by the second of said plungers.

11. An adjusting and connecting link for brake shoes or the like comprising a housing having diametrically opposed bores, plungers slidably engaged in said bores and arranged to support a cam, an adjustment device including a screw associated with said housing and a pressure plate for engaging said cam in a manner for varying its position with relation to the inner ends of said plungers to affect the distance between their said inner ends, said cam having surfaces so related to the surfaces of the inner ends of said plungers that when movement is given to one of said plungers a modified movement is effected by the second of said plungers.

12. An adjusting and connecting link for brake shoes comprising a housing having aligned bores, plungers slidably supported in said bores, a cam arranged to engage the inner ends of said plungers and rockably supported within said housing, adjustment means associated with said housing causing relative movement of said cam with respect to said plungers to affect the distance between the outer ends of said plungers, said cam having surfaces so related to the inner ends of said plungers as to cause a variation in movement between the same when movement is given to one of said plungers.

13. An adjusting and connecting link for brake shoes comprising a housing having aligned bores formed therein, plungers slidably supported within said bores, the inner surfaces of said plungers being slotted, cam means slidably supported within the said slotted ends, revoluble adjustment means for causing relative motion of said cam means with respect to the inner ends of said plungers to affect the distance between the inner ends of said plungers, locking means for said adjusting means including a plate element having a track in engaging relation with said cam means to prevent rotation of said plate element, and a spring element associated with said revoluble means and a second groove or track formed in said plate element.

14. An adjusting and connecting link for brake shoes comprising a housing having aligned bores formed therein, plungers slidably supported within said bores, the inner surfaces of said plungers being slotted, cam means slidably supported within the said slotted ends, revoluble adjustment means for causing relative motion of said cam means with respect to the inner ends of said plungers to affect the distance between the inner ends of said plungers, locking means for said adjusting means including a plate element having a track in engaging relation with said cam means to prevent rotation of said plate element, and a spring element associated with said revoluble means and a second groove or track formed in said plate element, said cam having its surface so related to the surface of the inner ends of said plungers that when movement is given to one of said plungers a modified movement is effected by the second of said plungers.

15. An adjusting and connecting link for brake shoes comprising a housing having aligned bores formed therein, plungers slidably supported within said bores, cam means arranged to engage the inner ends of said plungers, revoluble adjustment means for causing relative motion of said cam means with respect to the inner ends of said plungers to affect the distance between the inner ends of said plungers, locking means for said adjusting means including a plate element having a track in engaging relation with said cam means to prevent rotation of said plate element, and a spring element associated with said revoluble means and a second track formed in said plate element.

16. An adjusting and connecting link for brake shoes or the like comprising a housing having aligned bores on opposite sides, plungers slidably arranged in said bores, a cam pivotally supported and having surfaces engaging the inner surfaces of the said plungers, an adjustment device associated with said housing for causing bodily movement of said cam to affect the distance between the inner ends of said plungers, said cam being so pivotally supported and said cam surfaces having such contours, as to effect a varied modified movement of one of said plungers when a predetermined movement is given to the second of said plungers.

17. An adjusting and connecting link for brake shoes or the like comprising a housing having diametrically opposed bores, plungers having slotted inner ends slidably supported therein, a cam associated with the inner ends of said plungers in a manner to effect a modified movement of one of the plungers when a predetermined movement is given to the second plunger, adjustment means associated with said housing for causing bodily movement of said cam to affect the distance between the inner ends of said plungers.

18. An adjusting and connecting link for brake shoes or the like comprising a housing having diametrically opposed bores, plungers slidably supported therein, a cam associated with the inner ends of said plungers in a manner to effect a modified movement of one of the plungers when a predetermined movement is given to a second plunger, a pressure element for causing bodily movement of said cam, and adjusting means associated with said housing for effecting movement of said pressure plate whereby the distance between the inner ends of said plungers may be varied.

CLAUDE H. NICKELL.